United States Patent [19]

Ridyard

[11] 4,075,200
[45] Feb. 21, 1978

[54] 4(2'-NITRO-4'-SULFOANILINO) PHENYL AZO HYDROXYPHENYL DYES

[75] Inventor: Denis Robert Annesley Ridyard, Manchester, England

[73] Assignee: Imperial Chemical Industries Limited, London, England

[21] Appl. No.: 632,980

[22] Filed: Nov. 18, 1975

Related U.S. Application Data

[60] Continuation of Ser. No. 516,801, Oct. 21, 1974, abandoned, which is a continuation-in-part of Ser. No. 498,853, Aug. 19, 1974, abandoned, which is a division of Ser. No. 252,576, May 12, 1972, abandoned.

[30] Foreign Application Priority Data

May 17, 1971 United Kingdom .............. 15272/71

[51] Int. Cl.$^2$ ................................................ C09B 29/12
[52] U.S. Cl. ........................................................ 260/206
[58] Field of Search ......................................... 260/206

[56] References Cited

U.S. PATENT DOCUMENTS

| | | | |
|---|---|---|---|
| 3,109,840 | 11/1963 | Beffa et al. | 260/193 X |
| 3,391,132 | 7/1968 | Beffa et al. | 260/206 X |
| 3,535,306 | 10/1970 | Altermatt | 260/207.1 |
| 3,663,531 | 5/1972 | Liechti | 260/206 |
| 3,676,050 | 7/1972 | James | 260/184 X |
| 3,883,503 | 5/1975 | Van Assche et al. | 260/206 |

FOREIGN PATENT DOCUMENTS

| | | | |
|---|---|---|---|
| 2,224,116 | 11/1972 | Germany | 260/206 |
| 1,047,026 | 11/1966 | United Kingdom | 260/206 |

OTHER PUBLICATIONS

Venkataraman, *The Chemistry of Synthetic Dyes*, vol. I, Academic Press, Inc.: New York, 1952, p. 270.
Lubs., *The Chemistry of Synthetic Dyes & Pigments*, Reinhold Publishing Corp.: New York, 1955, pp. 670-671.

*Primary Examiner*—Charles F. Warren
*Attorney, Agent, or Firm*—Cushman, Darby & Cushman

[57] ABSTRACT

Monoazo dyestuffs of the formula

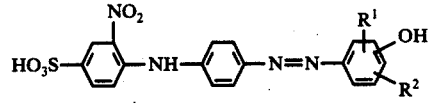

wherein the hydroxyl group is in the 2- or 4- position relative to the azo group, $R^1$ represents hydrogen, halogen, lower alkyl or lower alkoxy and $R^2$ represents hydrogen or lower alkyl with the proviso that when said hydroxyl group is in the 4- position relative to the azo group and one of $R^1$ and $R^2$ is lower alkyl and the other is hydrogen, the said lower alkyl is in a position other than meta to said hydroxyl group. The dyestuffs are useful as acid dyes for Nylon.

10 Claims, No Drawings

4(2'-NITRO-4'-SULFOANILINO) PHENYL AZO HYDROXYPHENYL DYES

This application is a continuation of application Ser. No. 516,801, filed Oct. 21, 1974, now abandoned, which is a continuation-in-part of Ser. No. 498,853 filed Aug. 19, 1974, now abandoned, which is a divisional of Ser. No. 252,576, filed May 12, 1972, now abandoned.

This invention relates to monoazo dyestuffs and their application to textile materials.

According to the invention, there are provided monoazo dyestuffs of the formula.

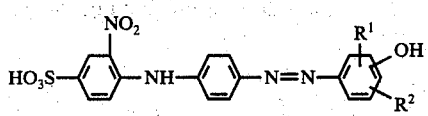

wherein the hydroxyl group is in the 2- or 4- position relative to the azo group, R¹ represents hydrogen, halogen, alkyl or alkoxy and R² represents hydrogen or alkyl with the proviso that when said hydroxyl group is in the 4- position relative to the azo group and one of R¹ and R² is lower alkyl and the other is hydrogen, the said lower alkyl is in a position other than meta to said hydroxyl group.

Halogens which may be represented by R¹ include chlorine and bromine. Alkyls which may be represented by R¹ and R² and alkoxy which may be represented by R¹ include lower alkyl and lower alkoxy, i.e. those containing from 1-4 carbon atoms.

Particularly useful dyestuff structures have the formula

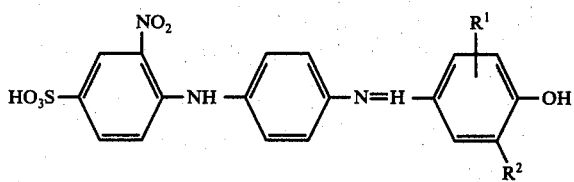

wherein R¹ is hydrogen and R² is lower alkyl and especially the structure where R² is methyl.

The dyestuffs of the invention can be prepared by diazotizing 2'-nitro-4-aminodiphenylamine-4'-sulphonic acid and coupling the resulting diazo compound with a phenol of the formula

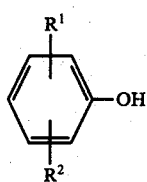

wherein R¹ and R² have the meanings already stated.

Suitable phenols for use in making the dyestuffs of the invention include phenol, o-cresol, p-cresol, o-chlorophenol, 2,5-dimethylphenol, 6-chloro-3-methyl phenol, 3,5-dimethylphenol, 2,6-dimethylphenol, 2-methoxyphenol, 3-methoxyphenol, 4-methoxyphenol, 2,4-dimethylphenol, 3,4-dimethylphenol and 4-t-butylphenol.

The dyestuffs of the present invention are particularly suitable for applying to synthetic polyamide textile materials, for example Nylon 66, Nylon 6 and Nylon 11, using any of the general methods known for the application of acid dyestuffs to such materials. The dyestuffs, if desired, may be diluted with any of the usual adjuvants which are used commercially to provide products of consistent strength. These include sodium chloride, sodium sulphate, sucrose and, in particular, dextrine. The dyestuffs give reddish-yellow colorations having a high degree of fastness to wet treatments and to light. In addition, the dyestuffs provide better coverage of barré Nylon and better levelling properties than corresponding dyes in which the hydroxyl group is replaced by a p-toluene sulphonic ester group and have higher tinctorial strength.

The invention is illustrated but not limited by the following example in which all parts and percentages are by weight.

EXAMPLE

A solution of 40 parts of 2'-nitro-4-aminodiphenylamine-4'-sulphonic acid (77.7%) in 500 parts of water and 12 parts of 36% sodium hydroxide solution is stirred at 20° C and 60 parts of 2N sodium nitrite solution is added. The mixture is added with vigorous agitation during 20 minutes at 10°–15° C to 30 parts of 36% hydrochloric acid in 400 parts of water. After stirring for 1 hour at 10°–15° C, the diazo suspension is added during 30 minutes at 0°–5° C to a stirred solution of 11 parts of o-cresol in 500 parts of water, 20 parts of 36% sodium hydroxide solution and 20 parts of sodium carbonate. Stirring is continued for a further 16 hours and the product is filtered off, washed with 5% brine solution and dried.

When applied to Nylon 66 from a neutral to weakly acid bath a strong reddish yellow shade is obtained which exhibits good coverage of barréness and levelling combined with very good wet fastness and excellent light fastness.

If the o-cresol in the above Example is replaced by the equivalent amount of phenol, p-cresol, o-chlorophenol, 2,4-dimethylphenol, 3,5-dimethylphenol, 2-methoxyphenol, 3-methoxyphenol, 4-methoxyphenol, 2,6-dimethylphenol or 2,5-dimethylphenol, dyestuffs with similar properties are obtained.

I claim:

1. A monoazo dyestuff having the formula

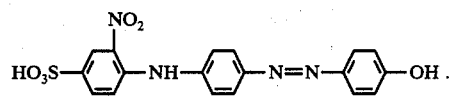

2. A monoazo dyestuff having the formula

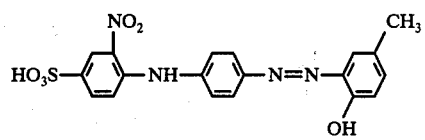

3. A monoazo dyestuff having the formula

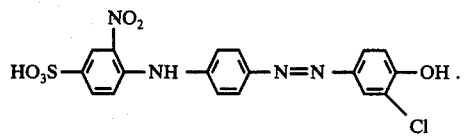

4. A monoazo dyestuff having the formula

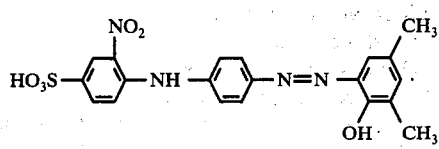
5. A monoazo dyestuff having the formula
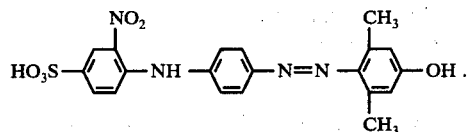
6. A monoazo dyestuff having the formula
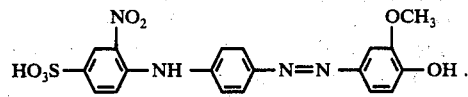
7. A monoazo dyestuff having the formula
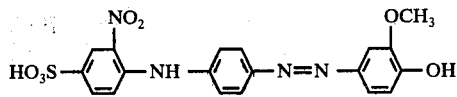
8. A monoazo dyestuff having the formula
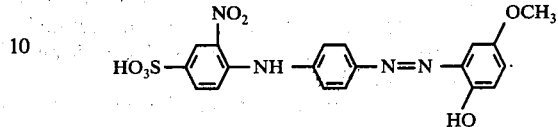
9. A monoazo dyestuff having the formula
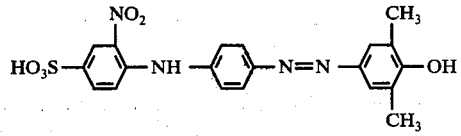
10. A monoazo dyestuff having the formula
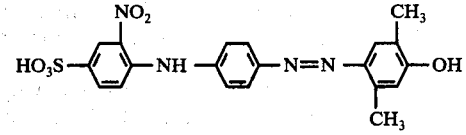
* * * * *